(12) United States Patent
Little et al.

(10) Patent No.: US 7,426,690 B1
(45) Date of Patent: Sep. 16, 2008

(54) EXTENSIBLE MARKUP LANGUAGE MARKUP CLONING ON TABLE ROWS AND CELLS IN A SOFTWARE APPLICATION DOCUMENT

(75) Inventors: Robert Little, Redmond, WA (US); Marcin Sawicki, Kirkland, WA (US); Brian Jones, Redmond, WA (US); Ziyi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 10/731,897

(22) Filed: Dec. 9, 2003

(51) Int. Cl.
*G06F 15/00* (2006.01)
(52) U.S. Cl. ...................................................... 715/503
(58) Field of Classification Search .................. 715/503
See application file for complete search history.

(56) References Cited

U.S. PATENT DOCUMENTS

| | | | |
|---|---|---|---|
| 4,802,673 A | 2/1989 | Patel | 273/153 S |
| 5,272,628 A | 12/1993 | Koss | 364/419.19 |
| 5,450,536 A | 9/1995 | Rosenberg et al. | 395/148 |
| 5,555,352 A | 9/1996 | Lucas | 395/123 |
| 5,588,099 A | 12/1996 | Mogilevsky et al. | 395/139 |
| 5,636,297 A | 6/1997 | Eller et al. | 382/293 |
| 5,774,584 A | 6/1998 | Matsumoto et al. | 382/194 |
| 5,835,916 A | 11/1998 | Inaki et al. | 707/509 |
| 5,873,106 A | 2/1999 | Joseph | 707/506 |
| 5,933,833 A | 8/1999 | Musashi | 707/102 |
| 6,044,383 A | 3/2000 | Suzuki et al. | 707/509 |
| 6,088,708 A | 7/2000 | Burch et al. | 707/509 |
| 6,112,216 A | 8/2000 | Pratley et al. | 707/509 |
| 6,144,974 A | 11/2000 | Gartland | 707/517 |
| 6,374,273 B1 | 4/2002 | Webster | 707/513 |
| 6,415,305 B1 | 7/2002 | Agrawal et al. | 707/503 |
| 6,613,098 B1 | 9/2003 | Sorge et al. | 715/503 |
| 6,678,865 B1 | 1/2004 | Pratley et al. | 715/509 |
| 6,747,643 B2 | 6/2004 | Happel | 345/419 |
| 6,816,170 B1 | 11/2004 | Udeshi | 345/660 |
| 6,822,663 B2 | 11/2004 | Wang et al. | 345/854 |
| 2001/0049699 A1 | 12/2001 | Pratley et al. | 707/503 |
| 2002/0124016 A1* | 9/2002 | Rank et al. | 707/503 |
| 2002/0188629 A1* | 12/2002 | Burfoot | 707/503 |
| 2003/0005410 A1* | 1/2003 | Harless | 717/114 |
| 2004/0015834 A1 | 1/2004 | Mestre et al. | 717/106 |
| 2004/0019589 A1* | 1/2004 | Basrur | 707/3 |
| 2004/0153449 A1* | 8/2004 | Bettendorf | 707/5 |

(Continued)

OTHER PUBLICATIONS

Bott, Ed; "Using Microsoft Office 2000"; Que Corporation; 1999.*

(Continued)

*Primary Examiner*—William Bashore
(74) *Attorney, Agent, or Firm*—Merchant & Gould P.C.

(57) ABSTRACT

Methods and systems are provided for automatically replicating table rows and cells marked up with Extensible Markup Language (XML) data (markup) to create new table rows and cells containing the same XML markup as a selected row and cells from which the new row and cells are replicated. A table row with one or more cells may be selected for replication. The selected row (source row) is parsed to determine XML markup (XML elements (tags)) applied to the row or cells contained therein. A new row(s) and corresponding cell(s) is created. XML markup applied to the source row and its cells is automatically applied to the new row and cells contained therein.

18 Claims, 4 Drawing Sheets

U.S. PATENT DOCUMENTS

2004/0205452 A1  10/2004  Fitzsimons et al. .......... 715/500
2005/0091231 A1* 4/2005  Pal et al. ..................... 707/100

OTHER PUBLICATIONS

Grover et al., "XML-based data preparation for Robust Deep Parsing", 2001, Association for Computational Linguistics, pp. 260-267.*

Buscaldi et al, "Tag Semantics for the Retrieval of XML Document", 2003, ACM, pp. 273-278.*

Anderson, Richard J., et al., "The Table Layout Problem," SCG '99, Miami Beach, FL, Jun. 1999, pp. 115-123 [ACM 1-58113-068-6/99/06].

Okubo, Tsuneo, et al., "New Algorithm for Overlapping Cell Treatment in Hierarchical CAD Data / Electron Beam Exposure Data Conversion", 27th ACM/IEEE Design Automation Conference, © 1990, pp. 321-326 [IEEE 0738-100X/90/006/0321].

Villard, Lionel, et al., "An Incremental XSLT Transformation Processor XML Documentation Manipulation", WWW '02, Honolulu, HI, May 7-11, 2002, pp. 474-485 [ACM 1-58113-449-5/02/0005].

Microsoft Computer Dictionary, 5th Edition, Microsoft Press, Redmond, WA, © 2002, pp. 129-130, 516 and 580.

Parker, Sybil P. (ed.), McGraw-Hill Dictionary of Scientific and Technical Terms, 5th Edition, McGraw-Hill, Inc., New York, NY, © 1994, p. 2006.

Microsoft Press Computer Dictionary, 3rd Edition, Microsoft Press, Redmond, WA, © 1997, p. 367.

Featuring Adobe FrameMaker 6.0, Adobe Systems Incorporated, © 2000.

* cited by examiner

EXTENSIBLE MARKUP LANGUAGE MARKUP CLONING ON TABLE ROWS AND CELLS IN A SOFTWARE APPLICATION DOCUMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention generally relates to use of table rows and cells in a computer-generated document. More particularly, the present invention relates to replication of a table row, including replication of application of Extensible Markup Language (XML) markup to a new table row or cell from a previous row or cell.

BACKGROUND OF THE INVENTION

Computer software applications allow users to create a variety of documents to assist them in work, education, and leisure. For example, popular word processing applications allow users to create letters, articles, books, memoranda, and the like. Spreadsheet applications allow users to store, manipulate, print, and display a variety of alphanumeric data. Such applications have a number of well-known strengths including rich editing, formatting, printing, calculation, and on-line and off-line editing.

In computer-generated documents, tables are often used to represent information whose basic structure is repeated from row to row. For example, consider a table representing financial results of various companies. Each column may represent a specific piece of financial information, such as revenues, net profits, earnings per share, and the like, while each row may represent a different company. It is typical for each consecutive row in a table to follow the same structure as the previous row. That is, each consecutive row typically consists of the same number of cells, each of the same size and meaning as are contained in the previous row. Many prior art word processing applications take the number of cells and sizes of a previous row into account when creating a new row that is structurally similar to a previous row. That is, some prior art word processing applications allow for the automatic creation of a new row that contains the same number and sizes of cells as a previous row.

It has become desirable to annotate computer-generated documents with helpful structure such as that provided by the Extensible Markup Language (XML). User-defined XML markup may be applied to a given row in a table where the row or individual cells within the row are marked up with XML markup structure. Unfortunately, prior art word processing applications do not allow for the automatic creation of a new row in a table that contains a replication of the XML markup applied to selected or previous row. Therefore, the user must manually re-apply XML markup to a newly created row if the user desires that the newly created row have the same XML markup as the row from which the newly created row is replicated. It is known to copy and paste a previously XML-formatted row in order to create a new row containing the same XML formatting, but such a procedure is cumbersome, inefficient, and requires the user to review the pasted row to ensure that the XML-formatting from the previous or selected row has been properly applied to the newly created row.

It is with respect to these and other considerations that the present invention has been made.

SUMMARY OF THE INVENTION

The present invention provides methods and systems for automatically replicating table rows and cells marked up with Extensible Markup Language (XML) data (markup) to create new table rows and cells containing the same XML markup as a selected row and cells from which the new row and cells are replicated. According to aspects of the present invention, a table row with one or more cells may be selected for replication. The selected row (source row) is parsed to determine XML markup (XML elements (tags)) applied to the row or cells contained therein. A new row and corresponding cell(s) is created. XML markup applied to the source row and its cells is automatically applied to the new row and cells contained therein. According to one aspect of the invention, only the cell-level and row-level markup is replicated. The XML markup that has been applied to a level lower than the cell (e.g., a paragraph within the cell or a set of characters) is not replicated. User-entered data (non-XML markup) entered into the source row and cells is not replicated into the new row and cells. According to aspects of the invention, the new row and cells may be inserted above or below the selected source row. Accordingly, a new row may be automatically created having the same application of XML markup as a selected or previous row.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

Embodiments of the present invention are directed to methods and systems for automatically replicating table rows and cells marked up with Extensible Markup Language (XML) data to create a new table row with cells containing the same cell-level and row-level XML markup as a selected row or previous row from which the new row is replicated. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting senses and the scope of the present invention is defined by the appended claims and their equivalents.

Figure 1:
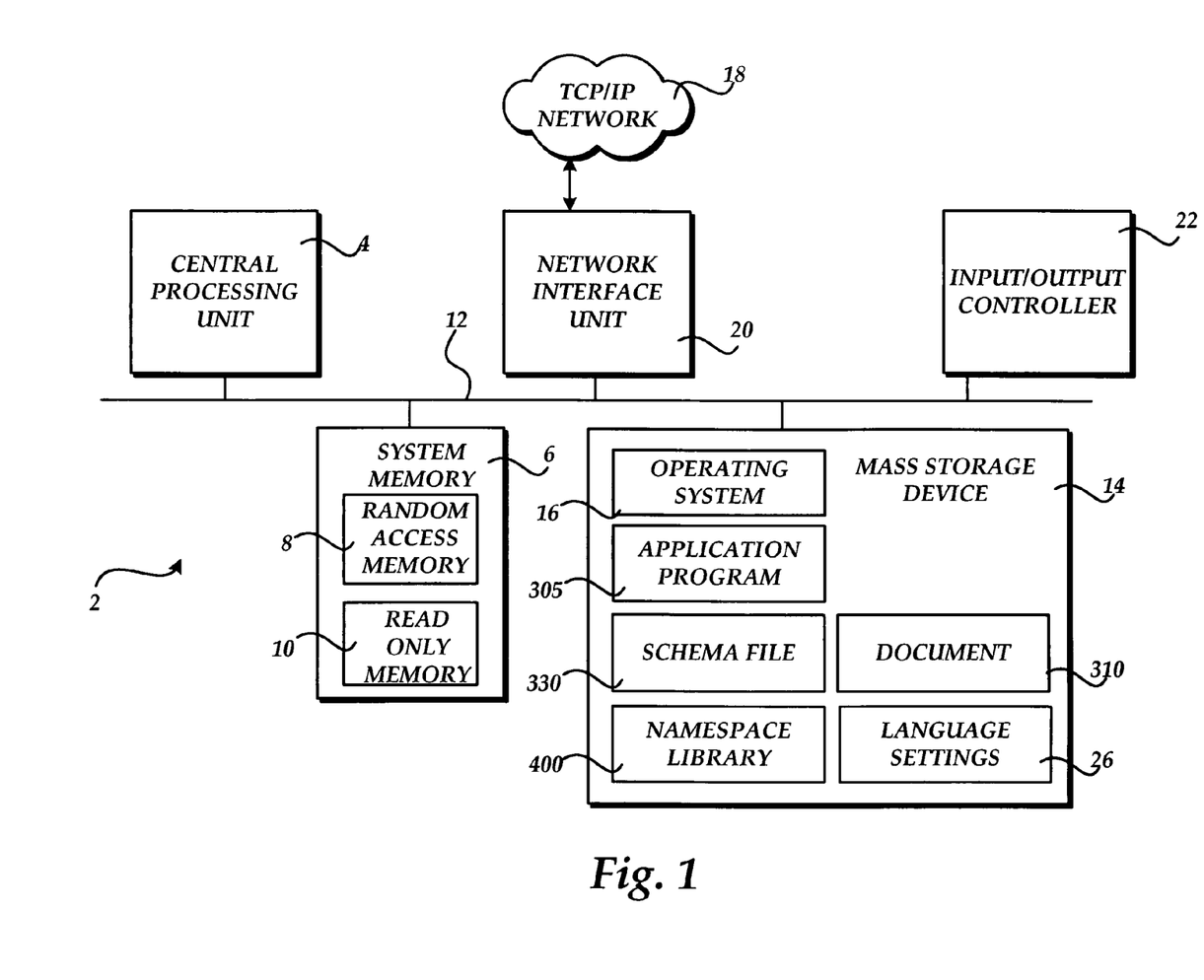
FIG. 1 is a simplified block diagram of a computing system and associated peripherals and network devices that provide an exemplary operating environment for the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 305, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 305 for creating and editing an electronic document 310. For instance, the application program 305 may comprise a word processing application program, a spreadsheet application, a contact application, and the like. Application programs for creating and editing other types of electronic documents may also be used with the various embodiments of the present invention. A schema file 330 and a namespace/schema library 400, described below, are also shown.

Figure 2:
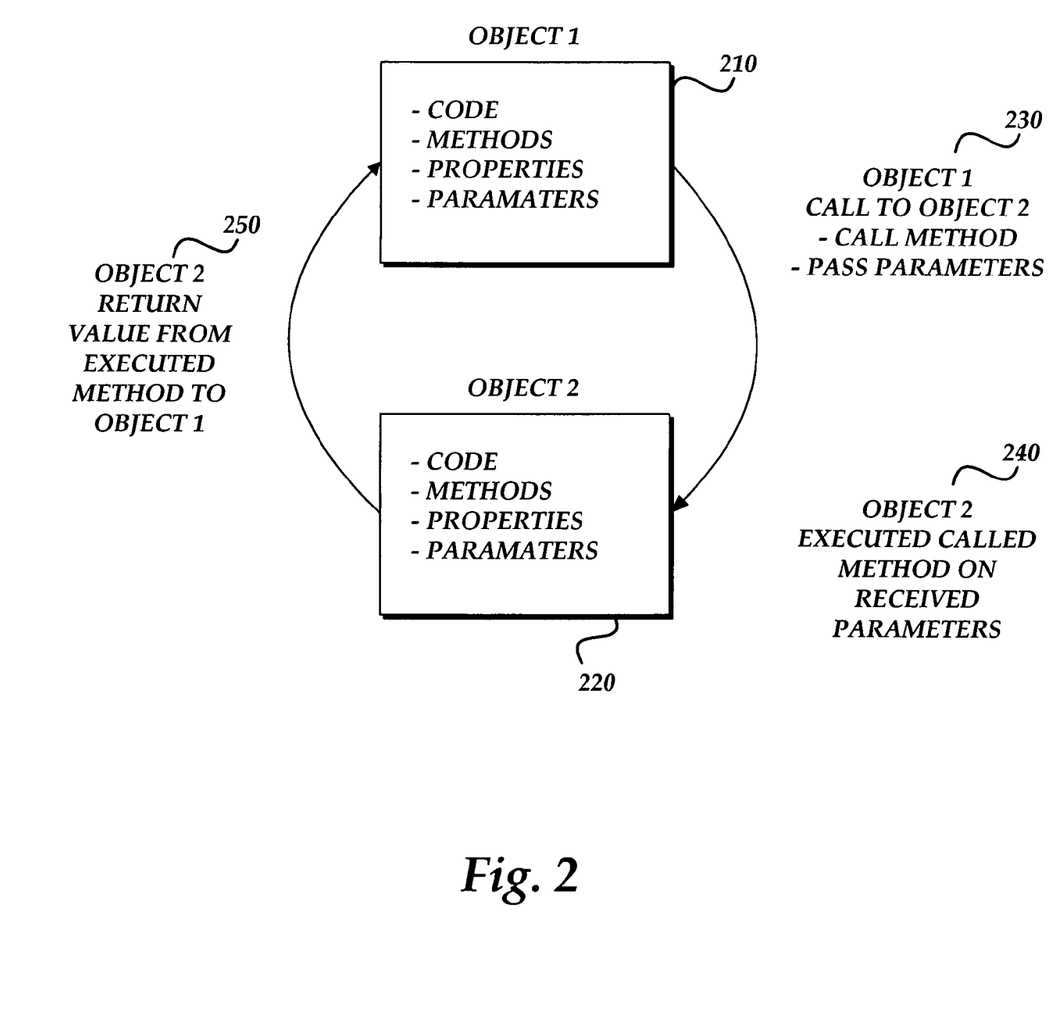
FIG. 2 is a simplified block diagram illustrating interaction between software objects according to an object-oriented programming model.

Exemplary embodiments of the present invention are implemented by communications between different software objects in an object-oriented programming environment. For purposes of the following description of embodiments of the present invention, it is useful to briefly to describe components of an object-oriented programming environment. FIG. 2 is a simplified block diagram illustrating interaction between software objects according to an object-oriented programming model. According to an object-oriented programming environment, a first object 210 may include software code, executable methods, properties, and parameters. Similarly, a second object 220 may also include software code, executable methods, properties, and parameters.

A first object 210 may communicate with a second object 220 to obtain information or functionality from the second object 220 by calling the second object 220 via a message call 230. As is well know to those skilled in the art of object-oriented programming environment, the first object 210 may communicate with the second object 220 via application programming interfaces (API) that allow two disparate software objects 210, 220 to communicate with each other in order to obtain information and functionality from each other. For example, if the first object 210 requires the functionality provided by a method contained in the second object 220, the first object 210 may pass a message call 230 to the second object 220 in which the first object identifies the required method and in which the first object passes any required parameters to the second object required by the second object for operating the identified method. Once the second object 220 receives the call from the first object, the second object executes the called method based on the provided parameters and sends a return message 250 containing a value obtained from the executed method back to the first object 210.

For example, in terms of embodiments of the present invention, and as will be described below, a first object 210 may be a third party customized application that passes a message to a second object such as an Extensible Markup Language schema validation object whereby the first object identifies a method requiring the validation of a specified XML element in a document where the specified XML element is a parameter passed by the first object with the identified method. Upon receipt of the call from the first object, according to this example, the schema validation object executes the identified method on the specified XML element and returns a message to the first object in the form of a result or value associated with the validated XML element. Operation of object-oriented programming environments, as briefly described above, are well known to those skilled in the art.

Figure 3:
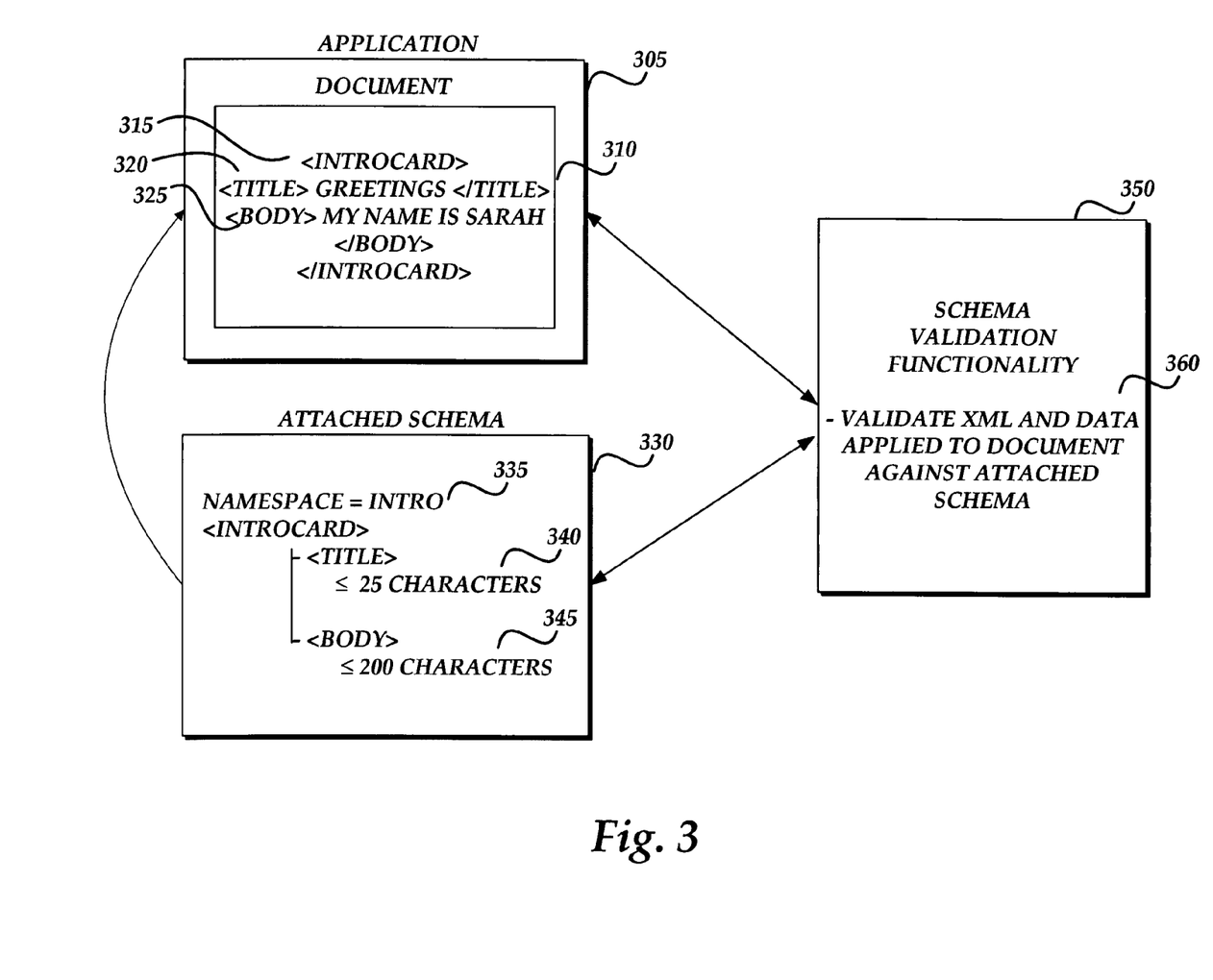
FIG. 3 is a block diagram illustrating interaction between a document, an attached schema file, and a schema validation functionality model.

As described below, embodiments of the present invention are implemented through the interaction of software objects in the use, customization, and application of components of the Extensible Markup Language (XML). FIG. 3 is a block diagram illustrating interaction between a document, an attached schema file, and a schema validation functionality module. As is well known to those skilled in the art, the Extensible Markup Language (XML) provides a method of describing text and data in a document by allowing a user to create tag names that are applied to text or data in a document that in turn define the text or data to which associated tags are applied. For example referring to FIG. 3, the document 310 created with the application 305 contains text that has been marked up with XML tags 315, 320, 325. For example, the text "Greetings" is annotated with the XML tag <title>. The text "My name is Sarah" is annotated with the <body> tag. According to XML, the creator of the <title> and <body> tags is free to create her own tags for describing the tags to which those tags will be applied. Then, so long as any downstream consuming application or computing machine is provided instructions as to the definition of the tags applied to the text, that application or computing machine may utilize the data in accordance with the tags. For example, if a downstream application has been programmed to extract text defined as titles of articles or publications processed by that application, the application may parse the document 310 and extract the text "Greetings," as illustrated in FIG. 3 because that text is annotated with the tag <title>. The creator of the particular XML tag naming for the document 310, illustrated in FIG. 3, provides useful description for text or data contained in the document 310 that may be utilized by third parties so long as those third parties are provided with the definitions associated with tags applied to the text or data.

According to embodiments of the present invention, the text and XML markup entered into the document 310 may be saved according to a variety of different file formats and according to the native programming language of the application 305 with which the document 310 is created. For example, the text and XML markup may be saved according to a word processing application, a spreadsheet application, and the like. Alternatively, the text and XML markup entered into the document 310 may be saved as an XML format whereby the text or data, any applied XML markup, and any formatting such as font, style, paragraph structure, etc. may be saved as an XML representation. Accordingly, downstream or third party applications capable of understanding data saved as XML may open and consume the text or data thus saved as an XML representation. For a detailed discussion of saving text and XML markup and associated formatting and other attributes of a document 310 as XML, see U.S. patent application entitled "Word Processing Document Stored in a Single XML File that may be Manipulated by Applications that Understanding XML," U.S. Ser. No. 10/187,060, filed Jun. 28, 2002, which is incorporated herein by reference as if fully set out herein. An exemplary schema in accordance with the present invention is disclosed beginning on page 11 in an application entitled "Mixed Content Flexibility," Ser. No. 10/726,077, filed Dec. 2, 2003, which is hereby incorporated by reference in its entirety.

In order to provide a definitional framework for XML markup elements (tags) applied to text or data, as illustrated in FIG. 3, XML schema files are created which contain information necessary for allowing users and consumers of marked up and stored data to understand the XML tagging definitions designed by the creator of the document. Each schema file also referred to in the art as a Namespace or XSD file preferably includes a listing of all XML elements (tags) that may be applied to a document according to a given schema file. For example, a schema file 330, illustrated in FIG. 3, may be a schema file containing definitions of certain XML elements that may be applied to a document 310 including attributes of XML elements or limitations and/or rules associated with text or data that may be annotated with XML elements according to the schema file. For example, referring to the schema file 330 illustrated in FIG. 3, the schema file is identified by the Namespace "intro" the schema file includes a root element of <intro card>.

According to the schema file 330, the <intro card> element serves as a root element for the schema file and also as a parent element to two child elements <title> and <body>. As is well known to those skilled in the art, a number of parent elements may be defined under a single root element, and a number of child elements may be defined under each parent element. Typically, however, a given schema file 330 contains only one root element. Referring still to FIG. 3, the schema file 330 also contains attributes 340 and 345 to the <title> and <body> elements, respectfully. The attributes 340 and 345 may provide further definition or rules associated with applying the respective elements to text or data in the document 310. For example, the attribute 345 defines that text annotated with the <title> element must be less than or equal to twenty-five characters in length. Accordingly, if text exceeding twenty-five characters in length is annotated with the <title> element or tag, the attempted annotation of that text will be invalid according to the definitions contained in the schema file 330.

By applying such definitions or rules as attributes to XML elements, the creator of the schema may dictate the structure of data contained in a document associated with a given schema file. For example, if the creator of a schema file 330 for defining XML markup applied to a resume document desires that the experience section of the resume document contain no more than four present or previous job entries, the creator of the schema file 330 may define an attribute of an <experience> element, for example, to allow that no more than four present or past job entries may be entered between the <experience> tags in order for the experience text to be valid according to the schema file 330. As is well known to those skilled in the art, the schema file 330 may be attached to or otherwise associated with a given document 310 for application of allowable XML markup defined in the attached schema file to the document 310. According to one embodiment, the document 310 marked up with XML elements of the attached or associated schema file 330 may point to the attached or associated schema file by pointing to a uniform resource identifier (URI) associated with a Namespace identifying the attached or associated schema file 330.

According to embodiments of the present invention, a document 310 may have a plurality of attached schema files. That is, a creator of the document 310 may associate or attach more than one schema file 330 to the document 310 in order to provide a framework for the annotation of XML markup from more than one schema file. For example, a document 310 may contain text or data associated with financial data. A creator of the document 310 may wish to associate XML schema files 330 containing XML markup and definitions associated with multiple financial institutions. Accordingly, the creator of the document 310 may associate an XML schema file 330 from one or more financial institutions with the document 310. Likewise, a given XML schema file 330 may be associated with a particular document structure such as a template for placing financial data into a desirable format.

According to embodiments of the present invention, a collection of XML schema files and associated document solutions may be maintained in a Namespace or schema library located separately from the document 310. The document 310 may in turn contain pointers to URIs in the Namespace or schema library associated with the one or more schema files attached to otherwise associated with the document 310. As the document 310 requires information from one or more associated schema files, the document 310 points to the Namespace or schema library to obtain the required schema definitions. For a detailed description of the use of an operation of Namespace or schema libraries, see U.S. patent application entitled "System and Method for Providing Namespace Related Information," U.S. Ser. No. 10/184,190, filed Jun. 27, 2002, and U.S. patent application entitled "System and Method for Obtaining and Using Namespace Related Information for Opening XML Documents," U.S. Ser. No. 10/185,940, filed Jun. 27, 2002, both U.S. patent applications of which are incorporated herein by reference as if fully set out herein. For a detailed description of a mechanism for downloading software components such as XML schema files and associated solutions from a Namespace or schema library, see U.S. patent application entitled Mechanism for Downloading Software Components from a Remote Source for Use by a Local Software Application, U.S. Ser. No. 10/164,260, filed Jun. 5, 2002.

Referring still to FIG. 3, a schema validation functionality module 350 is illustrated for validating XML markup applied to a document 310 against an XML schema file 330 attached to or otherwise associated with the document 310, as described above. As described above, the schema file 330 sets out acceptable XML elements and associated attributes and defines rules for the valid annotation of the document 310 with XML markup from an associated schema file 330. For example, as shown in the schema file 330, two child elements <title> and <body> are defined under the root or parent element <intro card>. Attributes 340, 345 defining the acceptable string length of text associated with the child elements <title> and <body> are also illustrated. As described above, if a user attempts to annotate the document 310 with XML markup from a schema file 330 attached to or associated with the document in violation of the XML markup definitions contained in the schema file 330, an invalidity or error state will be presented. For example, if the user attempts to enter a title string exceeding twenty-five characters, that text entry will violate the maximum character length attribute of the <title> element of the schema file 330. In order to validate XML markup applied to a document 310, against an associated schema file 330, a schema validation module 350 is utilized. As should be understood by those skilled in the art, the schema validation module 350 is a software module including computer executable instructions sufficient for comparing XML markup and associated text entered in to a document 310 against an associated or attached XML schema file 330 as the XML markup and associated text is entered in to the document 310.

According to embodiments of the present invention, the schema validation module 350 compares each XML markup element and associated text or data applied to the document 310 against the attached or associated schema file 330 to determine whether each element and associated text or data complies with the rules and definitions set out by the attached schema file 330. For example, if a user attempts to enter a character string exceeding twenty-five characters annotated by the <title> elements 320, the schema validation module will compare that text string against the text string attribute 340 of the attached schema file 330 and determine that the text string entered by the user exceeds the maximum allowable text string length. Accordingly, an error message or dialogue will be presented to the user to alert the user that the text string being entered by the user exceeds the maximum allowable character length according to the attached schema file 330. Likewise, if the user attempts to add an XML markup element between the <title> and the <body> elements, the schema validation module 350 will determine that the XML markup element applied by the user is not a valid element allowed between the <title> and <body> elements according to the attached schema file 330. Accordingly, the schema validation module 350 will generate an error message or dialogue to the user to alert the user of the invalid XML markup.

XML Markup Cloning on Table Rows and Cells in a Computer-Generated Document

As briefly described above, embodiments of the present invention are directed to methods and systems for automatically replicating table rows and cells marked up with Extensible Markup Language data to create a new table row with cells containing the same XML markup as a selected row or previous row from which the new row is replicated. Consider for example that a user has created on expense report, as follows, which is a document based upon a template that contains a table listing expenses.

The table may be marked up with expense report specific XML by the template author. For example, the following two rows are a sample of an example expense report document prepared by a template author containing a table made up of two rows each row having two cells.

| ‹Product ‹‹Name ‹Shoes ›Name›  | ‹Price ‹ $ 123.90›Price›› Product› |
| ‹Product ‹‹Name ‹Shirt›Name›   | ‹Price ‹ $ 32.30 › Price›› Product› |

The first row is marked up with the element <Product>. The first cell of that row is marked up with element <Name>. The second cell is marked up with element <Price>. According to an embodiment of the invention, even though the <Product> tags appear to be inside of the row (and inside of the cells) in the above example, the <Product> element is actually the parent element of that row and its appearance inside of the row (and cells) is just a side effect of the layout limitations of the user interface (UI). Similarly, the <Name> and the <Price> elements are actually parent elements of their corresponding cells and not children as the above may seem to suggest. There are UI implementations that are capable of showing the <Product> tags as surrounding the row (which they really are) and the <Price> and <Name> tags as surrounding the cells, and not as contained within the row or cell. This, however, is a display limitation and has no impact on the functionality of this invention.

The second row has identical XML markup elements as the first row. For purposes of example, user-entered data "Shoes" is entered in the cell contained within the "Name" element of row 1 and a price of "$123.90" is shown entered in the second cell of the first row, which is contained inside the <Price> element.

According to embodiments of the present invention, if the user desires to add additional rows to this table having the same XML markup of the previous rows, the user automatically generate a third row having the same physical structure, for example two cells, and having the identical XML markup around that row and those cells as the previous row. That is, the third row is a replication of the previous row including both the row's physical structure and the XML structure surrounding it. Accordingly, a new row is added to the table as follows.

| ‹Product›‹Name›Shoes‹/Name› | ‹Price›$ 123.90‹/Price›‹/Product› |
|---|---|
| ‹Product›‹Name›Shirt‹/Name› | ‹Price›$ 32.30 ‹/Price›‹/Product› |
| ‹Product›‹Name›‹/Name› | ‹Price›‹/Price›‹/Product› |

Figure 4:
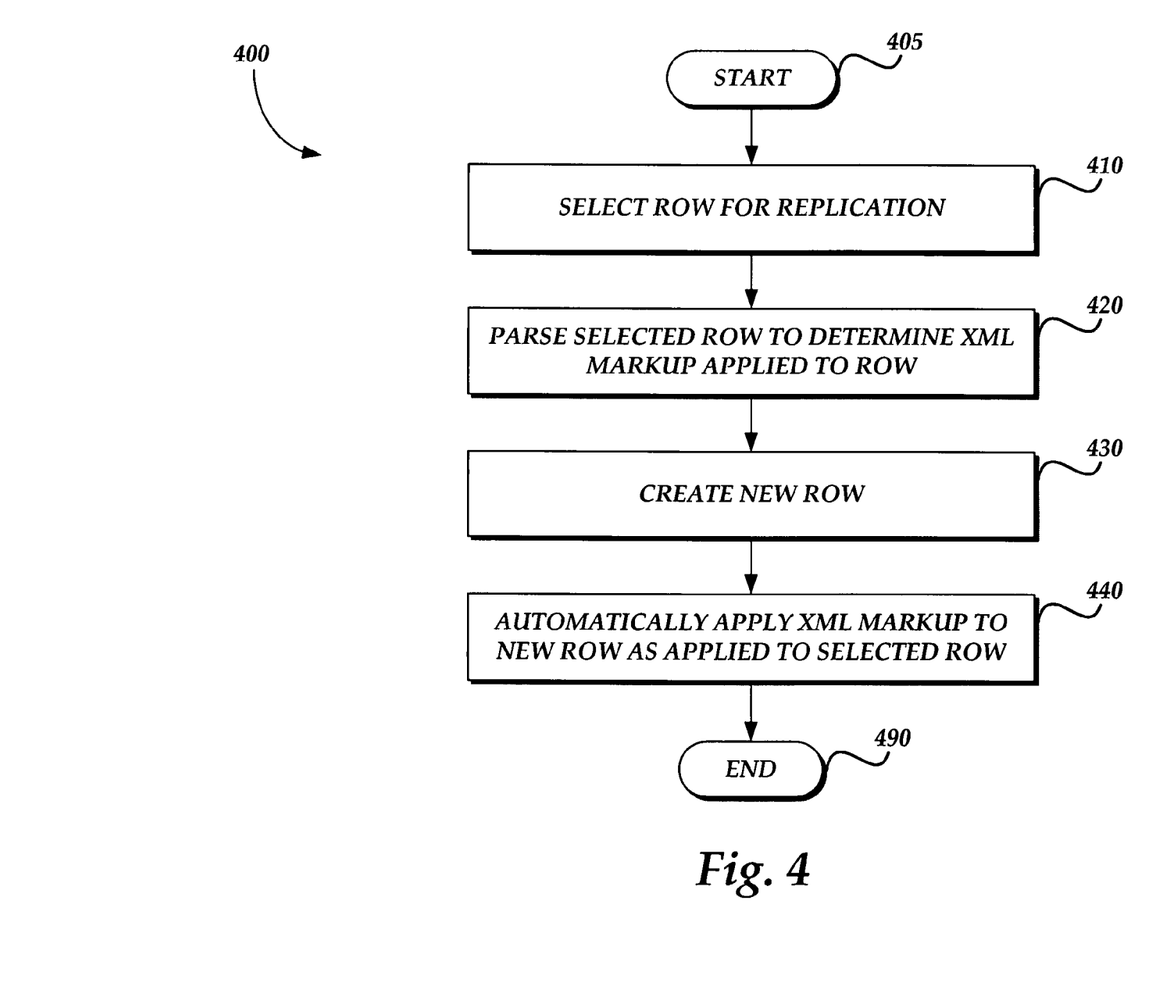
FIG. 4 illustrates an illustrative routine for automatically creating a new table row containing XML markup application as applied to a selected or previous row from which the new row is replicated.

FIG. 4 illustrates an illustrative routine for automatically creating a new table row containing XML markup application as applied to a selected or previous row from which the new row is replicated. Referring to the illustrative tables above, the method 400 begins at start Block 405 where the user has selected where they want a new row inserted. At Block 410 the application makes the determination, based on the users selection, as well as method of insertion, which row should be selected for replication. According to one embodiment, the user may place her insertion point such as a cursor in or at the end of a given row followed by selection of the "Tab" key, or the commands "Insert new row above", "Insert new row below". Alternatively, the user may select a given row or rows for replication by highlighting the selected row(s) and choosing the commands "Insert new row above", Insert new row below".

The logic in determining the selected row in 410 is covered with the following cases.

1. If the user action presses the "Tab" key, the new row will only be inserted if the cursor is in the last cell of the table. If this is the case, the row selected for replication is the last row in the table. A new row is then inserted after this last row (as covered in steps 420-440).
2. The user selects a single row, selecting the contents within a single row, or placing the cursor somewhere within a single row, and then choosing either of the commands "Insert new row above", or "Insert new row below". If this is the case, then the row that contains the selection is selected as the row for replication.
3. If multiple rows are selected, the user can choose either the "Insert new row above", or "Insert new row below" commands. If the "Insert new row above" command is selected, the row selected for replication is the first row of the selection. If the "Insert new row below" command is selected, the row selected for replication is the last row of the selection.

At Block 420, an XML parser according to embodiments of the present invention parses the selected row(s) to determine the XML markup applied to the row. At Block 430, the new row is created. When the new row is created, the new row is created with identical physical structure including the number and shapes and sizes of cells. The method then proceeds to Block 440 and the XML markup applied to the row selected in 410 (and to its cells) is applied to the newly created row (and its cells). The method ends at Block 490.

As described above, embodiments of the present invention may be utilized for inserting a new table row. According to one embodiment of the present invention, the user may be provided with a user interface for allowing the user to select that a newly created row should be inserted above or below a selected row. Consider for example the following row in which the user has placed the insertion point or cursor in the second cell inside the <cell> element.

| ‹rowXML1›‹cellXML1›‹/cellXML1› | ‹cellXML2›‹/cellXML2›‹/rowXML1› |
|---|---|
| ‹rowXML2›‹cellXML3›‹/cellXML3› | ‹rowXML4›cellXML4›‹/cellXML2› |

If the user selects the option of inserting a new row below the insertion point, the following result will occur.

| ‹rowXML1›‹cellXML1›‹/cellXML1› | ‹cellXML2›‹/cellXML2›‹/rowXML1› |
|---|---|
| ‹rowXML1›‹cellXML ›‹/cellXML1› | ‹rowXML2›cellXML2›‹/cellXML1› |
| ‹rowXML2›‹cellXML3›‹/cellXML3› | ‹rowXML4›cellXML4›‹/cellXML2› |

It should be appreciated, that had the user selected to have the new row inserted above the insertion point, then the new row with the corresponding XML markup would have been inserted in the row immediately above the row in which the user's insertion point was originally placed and the XML markup applied to the new row would be that markup applied to the row in which the user's insertion point was placed.

According to embodiments of the present invention, multiple rows may be selected by the user as shown below. Suppose the first two rows are selected as follows.

| ‹rowXML1›‹cellXML1›› cellXML1› | ‹cellXML2›› cellXML2›› rowXML1› |
|---|---|
| ‹rowXML2›‹cellXML3›› cellXML3› | ‹rowXML4›cellXML4›› cellXML2› |

When the user selects from a user interface that the selected rows are to be inserted above or below the selected rows, new rows equaling the number of selected rows will be created and will be populated with the XML markup applied to the multiple selected rows following the logic described in 410. The example shown below is if the user has selected to insert new rows above the selection.

| ‹rowXML1›‹cellXML1›› cellXML1› | ‹cellXML2›› cellXML2›› rowXML1› |
|---|---|
| ‹rowXML2›‹cellXML3›› cellXML3› | ‹rowXML4›cellXML4›› cellXML2› |
| ‹rowXML1›‹cellXML1›› cellXML1› | ‹cellXML2›› cellXML2›› rowXML1› |
| ‹rowXML2›‹cellXML3›› cellXML3› | ‹rowXML4›cellXML4›› cellXML2› |

As described above, the user may select the "Tab" key in the last cell of a table and a new row containing the same XML markup of the row in which the insertion point is placed will be added immediately below the row in which the insertion point is placed. As shown below, the insertion point is placed in the last cell of the second row of the illustrated table. When the user selects the "Tab" to create a new row, the new row is inserted immediately below the row in which the user's insertion point is placed, and the new row contains the XML markup applied to the last row.

| ‹Product›‹Name›Shoes›Name› | ‹Price› $ 123.90›Price›› Product› |
|---|---|
| ‹Product›‹Name›Shirt›Name› | ‹Price› $ 32.30 › Price›› Product› |

Then the user presses "Tab" to create the next row. The new row gets all the row and cell level markup replicated as follows:

| ‹Product›‹Name›Shoes›Name› | ‹Price› $ 123.90›Price›› Product› |
|---|---|
| ‹Product›‹Name›Shirt›Name› | ‹Price› $ 32.30 › Price›› Product› |
| ‹Product›‹Name›Name› | ‹Price›Price›› Product› |

As illustrated herein, any text or data entered by the user, such as the text "Shirt" and the data "$32.30" is not copied into the newly created row. Only the XML markup applied around the entire row and around each of its cells and related structure is copied to the new row and cells contained therein.

As described herein, methods and systems provide for automatically replicating table rows and cells marked up with Extensible Markup Language structure to create a new table row and corresponding cells containing the same XML markup as a selected row or a previous row from which the new row is replicated. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method of replicating a table row in a computer-generated document, comprising:
   selecting a source row for replication;
   parsing the source row to determine a number and a size of row cells contained in the source row;
   parsing the source row to determine Extensible Markup Language (XML) markup applied to the source row;
   automatically replicating the source row to create a second row that is a replica of the source row, wherein the second row is provided with a same number and size of cells as the source row and the XML mark-up is applied to the second row such that the second row includes the same XML markup around it as the source row; and
   causing the computer-generated document to be displayed with the second row, wherein automatically replicating the source row to create the second row does not copy non-XML markup data included in the source row to the second row.

2. The method of claim 1, whereby automatically replicating the source row to create the second row does not copy XML markup existing inside the cells, on the paragraph or character level.

3. The method of claim 1, whereby selecting the source row for replication includes placing a software application insertion point in the source row.

4. The method of claim 3, further comprising Selecting to insert the second row below the source row.

5. The method of claim 4, further comprising selecting to insert the second row above the source row.

6. The method of claim 5, further comprising inserting the second row above the source row or below the source row based on user input.

7. The method of claim 6, whereby selecting a source row includes selecting a plurality of source rows.

8. The method of claim 7, whereby parsing the source row to determine a number of row ceils contained in the source row includes parsing each of the plurality of source rows to determine a number of row cells contained in each of the plurality of source rows; and whereby parsing the source row to determine XMI, markup applied to the source row includes parsing each of the plurality of source rows to determine XML markup applied to each of the plurality of source rows.

9. The method of claim 8, whereby automatically replicating the source row to create a second row includes replicating each of the plurality of selected source rows;

automatically replicating each of the plurality of selected source rows to create a plurality of additional rows whereby the additional rows contain the same number and size of cells as the plurality of selected rows; and automatically replicating each of the plurality of second rows such that the additional rows include the same XML markup around each of the additional rows and their ceils as the plurality of selected rows and their cells.

10. A computer-implemented method of replicating a table row in a computer-generated document, comprising:

selecting a source row in the table for replication;

parsing the source row to determine a number and a size of row cells contained in the source row;

parsing the source row to determine Extensible Markup Language (XML) markup applied to the source row;

automatically replicating the source row to create a second row that includes the same number and size of cells as the source row and that includes the same XML markup as the source rows; and causing the computer-generated document to be displayed with the second row having the number and the size of the row cells contained in the source row, wherein automatically replicating the source row to create the second row does not copy non-XML markup data included in the source row to the second row.

11. The method of claim 10, further comprising inserting the second row above the source row.

12. The method of claim 10, further comprising inserting the second row below the source row.

13. The method of claim 10, further comprising inserting the second row above the source row or below the source row based on user input.

14. The method of claim 10, whereby selecting a source row includes selecting a plurality of source rows.

15. The method of claim 14, whereby parsing the source row to determine a number of row cells contained in the source row includes parsing each of the plurality of source rows to determine a number of row ceils contained in each of the plurality of source rows; and whereby parsing the source row to determine XML markup applied to the source row includes parsing each of the plurality of source rows to determine XML markup applied to each of the plurality of source rows.

16. The method of claim 15, whereby automatically replicating the source row to ere, ate a second row includes replicating each of the plurality of selected source rows;

automatically replicating each of the plurality of selected source rows to create a plurality of additional rows whereby the additional rows contain the same number and size of cells as the plurality of selected rows; and automatically replicating each of the plurality of second rows such that the additional rows include the same XML markup as the plurality of selected rows.

17. A computer readable medium on which are stored instructions which when executed by a computer perform a method of replicating a table row in a computer-generated document, comprising:

selecting a source row in the table for replication;

parsing the source row to determine a number and a size of row cells contained in the source row;

parsing the source row to determine Extensible Markup Language (XML) markup applied to the source row;

automatically replicating the source row to create a second row that includes the same number and size of cells as the source row and that includes the same XML markup as the source row, wherein automatically replicating the source row to create the second row does not copy non-XML markup data included in the source row to the second row; and inserting the second row above the source row or below the source row based on user input.

18. The computer readable medium of claim 17, whereby selecting a source row includes selecting a plurality of source rows;

whereby parsing the source row to determine a number of row cells contained in the source row includes parsing each of the plurality of source rows to determine a number of row cells contained in each of the plurality of source rows;

whereby parsing the source row to determine XML markup applied to the source row includes parsing each of the plurality of source rows to determine XML markup applied to each of the plurality of source rows;

automatically replicating each of the plurality of selected source rows to create a plurality of additional rows whereby the additional rows contain the same number and size of cells as the plurality of selected rows; and automatically replicating each of the plurality of second rows such that the additional rows include the same XML markup as the plurality of selected rows.

* * * * *